United States Patent
Hwang et al.

(10) Patent No.: US 8,620,070 B2
(45) Date of Patent: Dec. 31, 2013

(54) CORRESPONDING IMAGE PROCESSING METHOD FOR COMPENSATING COLOUR

(75) Inventors: Young-Bae Hwang, Seoul (KR);
Je-Woo Kim, Seongnam-si (KR);
Byeong-Ho Choi, Yongin-si (KR)

(73) Assignee: Korean Electronics Technology Institute, Seongnam-Si (KR)

( * ) Notice: Subject to any disclaimer, the term of this patent is extended or adjusted under 35 U.S.C. 154(b) by 103 days.

(21) Appl. No.: 13/288,477

(22) Filed: Nov. 3, 2011

(65) Prior Publication Data

US 2012/0308126 A1 Dec. 6, 2012

(30) Foreign Application Priority Data

May 31, 2011 (KR) .................. 10-2011-0052031
Jul. 4, 2011 (KR) .................. 10-2011-0065974

(51) Int. Cl.
*G06K 9/00* (2006.01)
(52) U.S. Cl.
USPC .................................. 382/165; 382/167
(58) Field of Classification Search
USPC ................... 382/154, 162, 165, 167
See application file for complete search history.

(56) References Cited

U.S. PATENT DOCUMENTS

| | | | |
|---|---|---|---|
| 6,668,082 B1 * | 12/2003 | Davison et al. | 382/190 |
| 6,757,445 B1 * | 6/2004 | Knopp | 382/285 |
| 7,224,357 B2 * | 5/2007 | Chen et al. | 345/420 |
| 2005/0008220 A1 * | 1/2005 | Miyazaki | 382/154 |
| 2008/0144925 A1 * | 6/2008 | Zhu et al. | 382/154 |
| 2009/0080772 A1 * | 3/2009 | Lin et al. | 382/167 |
| 2010/0128971 A1 * | 5/2010 | Kamiya et al. | 382/154 |
| 2010/0134647 A1 * | 6/2010 | Orboubadian | 348/222.1 |
| 2010/0302355 A1 * | 12/2010 | Tamaru | 348/59 |
| 2010/0322482 A1 * | 12/2010 | Kochi et al. | 382/106 |
| 2011/0025825 A1 * | 2/2011 | McNamer et al. | 348/46 |
| 2013/0002828 A1 * | 1/2013 | Ding et al. | 348/49 |
| 2013/0004059 A1 * | 1/2013 | Said | 382/154 |

FOREIGN PATENT DOCUMENTS

| | | |
|---|---|---|
| JP | 2005-173840 | 6/2005 |
| KR | 10-2000-0076565 A | 12/2000 |

OTHER PUBLICATIONS

Office Action issued on May 31, 2013 from the Korean Patent Office in a counterpart Korean Application No. 10-2011-0065974.

* cited by examiner

*Primary Examiner* — Li Liu
(74) *Attorney, Agent, or Firm* — Sughrue Mion, PLLC

(57) ABSTRACT

A corresponding image processing method is provided. The corresponding image processing method includes a first step for searching for a corresponding point of a corresponding image; a second step for performing radiometric calibration such that a camera response function of the corresponding image has a linear function; a third step for compensating for a color of the corresponding image by calculating a color conversion matrix; and a fourth step for measuring similarity of the corresponding image.

12 Claims, 7 Drawing Sheets

CORRESPONDING IMAGE PROCESSING METHOD FOR COMPENSATING COLOUR

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on May 31, 2011, and assigned Serial No. 10-2011-0052031 and claims the benefit under 35 U.S.C. §119(a) to a Korean patent application filed in the Korean Intellectual Property Office on Jul. 4, 2011, and assigned Serial No. 10-2011-0065974, the entire disclosure of which is hereby incorporated by reference.

TECHNICAL FIELD OF THE INVENTION

The present invention relates generally to a corresponding image processing method. More particularly, the present invention relates to a method for measuring similarity of a corresponding image and compensating for a color.

BACKGROUND OF THE INVENTION

In general, one of methods for obtaining 3D image information combines 2D image information obtained from various views. In so doing, it is quite important to find corresponding points of the same physical location and the same characteristics in a plurality of images including the same object or scene.

Particularly, for images obtained using a plurality of cameras, a technique for compensating for color difference which rises from different color values of the obtained images is required. To compensate for the color difference, a conventional method uses Macbeth color checker chart.

For the color compensation, Korean Patent Publication No. 10-2010-0035497 discloses a method for compensating for the color by obtaining an image with the Macbeth color chart in each camera, calculating the color of each color patch with pixel average, and calculating a unit conversion matrix which equals the color of the patches. However, this method has the following problems.

Firstly, the color compensation method using the Macbeth color chart considers only hardware characteristics of the camera and thus needs to compensate for the color frequently because it cannot reflect other conditions (for example, lighting and weather change) in the actual shooting. Secondly, the method is inapplicable when parameters of the camera automatically change. Thirdly, since the Macbeth color chart image is uniform, it is difficult to automatically match the corresponding point. Fourthly, since even the camera of the same model has its own nonlinear camera response function per parameter of the camera, the color is not precisely compensated merely using the conversion matrix.

Meanwhile, for the color compensation as stated above, it is necessary to find the accurate correspondence between pixels of the same color in a plurality of images. Yet, the conventional method uses motionless image or geometrical registration to find the correspondence of the images and thus has the following problems.

Firstly, when the scene (the image) includes one or more planes, the accurate correspondence between the pixels is not attained using the geometric registration. Secondly, when the camera is close to the scene, the geometric registration is not properly obtained. Thirdly, since the accurate pixel correspondence is not obtained, the color comparison is not precise and the image similarity reliability calculated with the sum degrades.

Hence, what is needed is a method for addressing the problems of the color compensation methods using the Macbeth color chart and for enhancing the similarity reliability of the corresponding image for the color compensation of the corresponding image.

SUMMARY OF THE INVENTION

To address the above-discussed deficiencies of the prior art, it is a primary aspect of the present invention to provide a corresponding image processing method for enhancing similarity reliability of a corresponding image by generating corresponding blocks and overlap regions in the corresponding image, calculating similarity, and applying a weight.

Another aspect of the present invention is to provide a corresponding image processing method which allows automatic corresponding point matching without using a color chart and is applicable under various conditions.

According to one aspect of the present invention, a corresponding image processing method includes a first step for searching for a corresponding point of a corresponding image; a second step for performing radiometric calibration such that a camera response function of the corresponding image has a linear function; a third step for compensating for a color of the corresponding image by calculating a color conversion matrix; and a fourth step for measuring similarity of the corresponding image.

The first step may include detecting features using a feature detecting method based on a corner point; deriving a first matching point N by matching the features; deriving a second matching point M by removing outlier in the first matching point N; and determining suitability of the feature detection.

The determining of the suitability of the feature detection may include when the number of the second matching points M is divided by the number of the first matching points N and a quotient falls below 0.7, re-detecting the features using a feature detecting method based on invariant features; and matching the features and re-deriving the second matching point M2 by removing outlier.

The first step may further include determining corresponding point determination suitability, and the determining of the corresponding point determination suitability may determine whether R, G, B color distribution value of the second matching point M or M2 exceeds or falls below 20% of R, G, B color distribution value of the entire image.

The first step may further include when the R, G, B color distribution value of the second matching point M or M2 exceeds 20% of the R, G, B color distribution value of the entire image, determining the second matching point M or M2 as a corresponding point; when the R, G, B color distribution value of the second matching point M or M2 falls below 20% of the R, G, B color distribution value of the entire image, re-deriving a matching point using dense stereo matching; and determining the re-derived matching point as the corresponding point.

The second step may include calculating the response function of a camera; calculating an inverse function of the response function; and converting an image to an image having a linear camera response function by applying the calculated inverse function to the image.

The third step may be is any one of a method for calculating the color conversion matrix based on least square based on Equation 1, a method for calculating a 3×3 RGB color conversion matrix based on Equation 2, and a method for calculating a color conversion matrix including a nonlinear polynomial based on Equation 3.

$$\sum_{s=1}^{NS} \left(\vec{Ic_s} - (a_c \vec{Tc_s} + b_c)\right)^2, c \in R, G, B \quad \text{[Equation 1]}$$

$$\sum_{s=1}^{NS} \left(\vec{I_s} - T_{RGB} \cdot \vec{T_s}\right)^2 \quad \text{[Equation 2]}$$

$$\sum_{k=1}^{D} (t_{rck} Ir_s^k + t_{gck} Ig_s^k + t_{bck} Ib_s^k) + t_{c0} \cong Tc_s \quad \text{[Equation 3]}$$

The fourth step may include a 4-1 step for searching for a plurality of corresponding points between corresponding images; a 4-2 step for calculating a first similarity indicating similarity level of the corresponding blocks by generating a plurality of corresponding blocks including the corresponding points in the corresponding image and comparing color distribution of the corresponding blocks; a 4-3 step for calculating a second similarity indicating similarity level of the overlapping regions by generating overlap regions where images are overlapped in a whole region of the corresponding image and comparing color distribution of the overlap regions; and a 4-4 step for measuring similarity of the corresponding image by applying a weight to the first similarity and the second similarity.

The 4-2 step may include generating the plurality of the corresponding blocks including the corresponding points in the corresponding image; calculating and comparing a normalized average of R, G, B color intensity value of the corresponding blocks; calculating and comparing a histogram of the corresponding blocks; and calculating the first similarity by applying a weight to the normalized average difference and the histogram difference.

The calculating of the first similarity may be based on Equation 4.

$$S_{block}(i, j) = \sum_{c=r,g,b} S_\mu^c(i, j) + \alpha_1 \cdot \sum_{c=r,g,b} \sqrt{\sum_{k=1}^{N} [d_k^c(H_i, H_j)]^2} \quad \text{[Equation 4]}$$

The 4-3 step may include generating the overlap regions where the images are overlapped in the whole region of the corresponding image; calculating and comparing the normalized average of the R, G, B color intensity value of the overlapping regions; calculating and comparing the histogram of the overlap regions; and calculating the second similarity by applying a weight to the normalized average difference and the histogram difference.

The calculating of the second similarity may be based on Equation 5.

$$S_{image}(i, j) = \sum_{c=R,G,B} \left| \frac{\mu_i^c}{\sigma_i^c} - \frac{\mu_j^c}{\sigma_j^c} \right| + \alpha_2 \cdot \sum_{c=R,G,B} d^c(H_i, H_j). \quad \text{[Equation 5]}$$

The 4-4 step may be based on Equation 6 and Equation 7:

$$S_{total}(i, j) = S_{block}(i, j) + \beta \cdot S_{image}(i, j) \quad \text{[Equation 6]}$$

$$\beta = 0.1 + 0.4 \times \left(1 - \frac{\bigcup_{k=1}^{N} \text{Region}_i(k)}{\text{Overlap Region}_i}\right) + \quad \text{[Equation 7]}$$

$$0.4 \times \left(1 - \frac{\bigcup_{k=1}^{N} \text{Region}_j(k)}{\text{Overlap Region}_j}\right)$$

According to another aspect of the present invention, a computer-readable recording medium contains a program for executing the method according to an exemplary embodiment of the present invention.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents.

Figure 1:
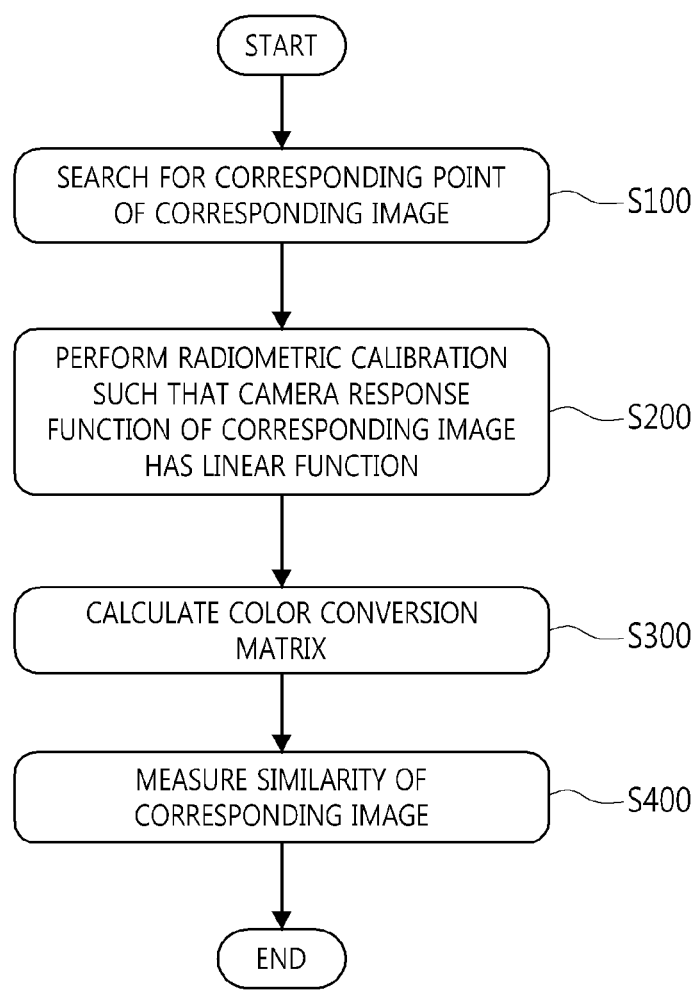
FIG. 1 is a flowchart of a corresponding image processing method according to an exemplary embodiment of the present invention.

FIG. 1 is a flowchart of a corresponding image processing method S according to an exemplary embodiment of the present invention. Referring to FIG. 1, the corresponding image processing method S includes a first step for searching for a corresponding point of a corresponding image (S100), a second step for performing radiometric calibration such that a camera response function of the corresponding image has a linear function (S200), a third step for compensating for color of the corresponding image by calculating a color conversion matrix (S300), and a fourth step for measuring similarity of the corresponding image (S400). Hereafter, the steps are explained in detail respectively.

(1) First Step (S100)

Figure 2:
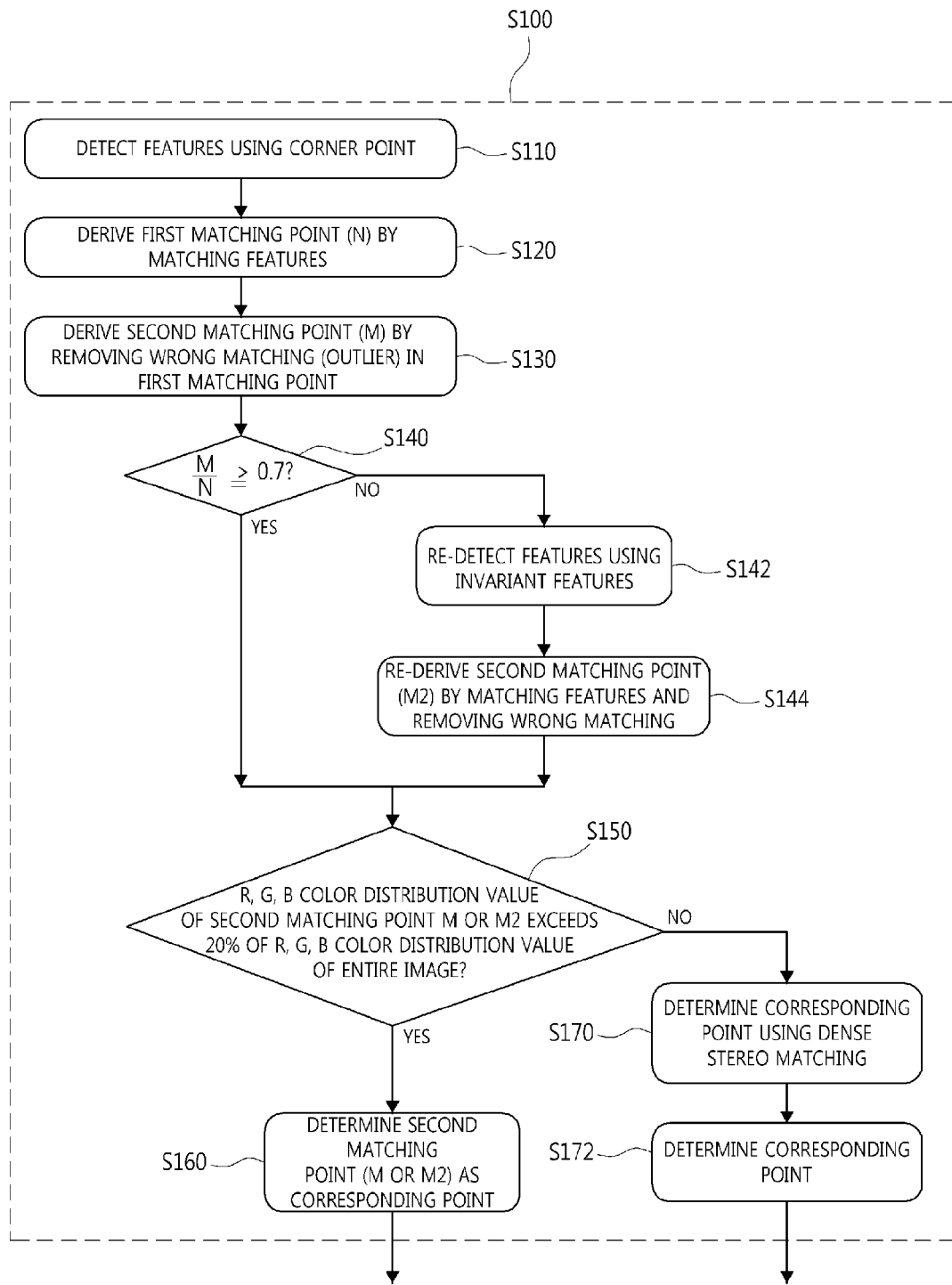
FIG. 2 is a detailed flowchart of a corresponding point searching step of FIG. 1.

FIG. 2 is a detailed flowchart of the corresponding point searching step of FIG. 1.

Herein, the corresponding point indicates points of the same physical location and the same characteristics in a plurality of images including the same object or scene. There can be various methods for searching for the corresponding point. In exemplary embodiments of the present invention, a method for extracting and matching features of the corresponding image is mainly described, and a dense stereo matching method for every pixel is described secondarily, which shall be explained.

The corresponding point searching step (S100) can include detecting the features using a corner point (S110), deriving a first matching point N by matching the features (S120), deriving a second matching point M by removing wrong matching (outlier) in the first matching point N (S130), and determining suitability of the feature detection (S140).

Herein, the features indicate feature points in the image and can be detected mostly in the corner point or the boundary line of the image. While the features can be detected in various manners, a feature detecting method based on the corner point is primary and a feature detecting method based on invariant features is secondary in exemplary embodiments of the present invention.

In exemplary embodiments of the present invention, a method for detecting the features based on the corner point to find the corresponding point of the corresponding image can be performed first.

The feature detecting method based on the corner point, which is referred to as a Harris corner detector, detects the rotation invariant features using an eigenvalue and a corner response function based on the fact that the corner point has high curvature in two directions.

First, the features are detected using the corner point. The corner point (Harris corner) can be calculated based on equation 1.

$$A = \sum_u \sum_v w(u,v) \begin{pmatrix} I_x^2 & I_x I_y \\ I_x I_y & I_y^2 \end{pmatrix} = \begin{bmatrix} \langle I_x^2 \rangle & \langle I_x I_y \rangle \\ \langle I_x I_y \rangle & \langle I_y^2 \rangle \end{bmatrix}$$ [Equation 1]

A is a so-called Harris matrix and denotes a matrix calculated to obtain the corner point. w(u,v) is a weight for Gaussian weight, and u and v denote the location of the mask added to calculate the matrix A. I denotes one point in the image, $I_x$ denotes a differential value in the x direction, and $I_y$ denotes a differential value in the y direction. $\langle \ \rangle$ in the right matrix element denotes the sum of the Gaussian weight and the mask.

The degree of the corner point as above can be calculated based on Equation 2.

$$M_C = \lambda_1 \lambda_2 - k(\lambda_1 + \lambda_2)^2 = det(A) - k\,trace^2(A)$$ [Equation 2]

$M_C$ denotes the corner degree and the greater $M_C$ indicates the greater corner degree. Meanwhile, $\lambda_1$ and $\lambda_2$ are eigenvalues of the matrix A, k denotes a constant, det denotes a matrix value, and trace denotes an exterior angle sum. Equation 1 and Equation 2 are well known and thus shall not be explained in detail.

The feature detecting method based on the corner point exhibits the fast feature detecting speed with a little calculation, and high reliability with a high probability of extracting the features in the corner point (S110).

Next, the first matching point N is derived by matching the detected features. A method for matching the features is not limited. For example, the feature matching method can use template matching or descriptor matching.

The template matching generates a first block in a certain size based on the feature point, generate a second block of the same size for each point of a search region of the image to match the block, and then derives the point having the most similar block as the matching point by comparing the first block and the second block.

Meanwhile, the descriptor matching describes the feature point vicinity with a descriptor and then derives two feature points as the matching point when the most similar descriptor exists in the corresponding images. An algorithm for the descriptor matching includes, for example, Scale Invariant Feature Transform (SIFT). The SIFT generates subregions by calculating a gradient in the image, and generates the whole region by distinguishing the gradient orientation histogram of pixels in each subregion.

The template matching or the descriptor matching can be adequately selected based on the status of the corresponding image. For example, when the corresponding image is relatively close to limit the search region, the template matching is feasible. When the scale of the corresponding image changes or the corresponding image is rotated, the descriptor matching is feasible. Meanwhile, the first matching point N indicates matching points obtained after the matching of the matching methods (S120).

Next, the second matching point M is derived by removing the wrong match (the outlier) in the first matching point N. The second matching point M indicates the matching points finally acquired by removing the wrong matching.

A method for removing the wrong matching can use, for example, a geometric model such as homography, and an estimation approach such as Random Sample Consensus (RANSAC). The methods for removing the wrong matching using the homography and the RANSAC are well known and shall be omitted here (S130).

Next, the suitability of the feature detection is determined. Herein, the suitability determination of the feature detection implies that propriety of the feature detecting method based on the corner point is examined.

While the feature detecting method based on the corner point exhibits fast feature detection speed and high reliability, it cannot cope with the scale change or the rotation change of the image. Hence, since it is hard to apply the feature detecting method in a particular case, other feature detecting method is applied when the feature detecting method based on the corner point is inappropriate.

In more detail, when the number of the second matching points M is divided by the number of the first matching points N and the quotient M/N is greater than 0.7, the feature detecting method based on the corner point is adequate. Conversely, when the number of the second matching points M is divided by the number of the first matching points N and the quotient M/N is smaller than 0.7, the feature detecting method based on the corner point is inadequate and thus the feature detecting method based on the invariant features is selected to repeat those steps.

Herein, the feature detecting method based on the invariant features detects the features using the invariant features or the partially invariant features of the corresponding region in the image, and can employ an algorithm such as SIFT or Speeded Up Robust Features (SURF). The feature detecting method based on the invariant features is well known and its detailed description shall be omitted.

That is, the features are redetected using the invariant features (S142), the redetected features are matched, and then the second matching point M2 is re-derived by removing the wrong matching (S144). Herein, the feature matching method (the template matching or the descriptor matching) and the wrong matching removing method (the homography and the RANSAC) can be the same as or similar to those as stated above and shall be omitted.

Meanwhile, the second matching point M2 is derived according to the feature detecting method based on the invariant features, and is distinguished from the second matching point M derived according to the feature detecting method based on the corner point.

As such, the present invention firstly adopts the feature detecting method based on the corner point, and can apply the feature detecting method based on the invariant features when the conditions are not satisfied (S140).

Next, the suitability of the corresponding point determination is determined. Herein, the suitability of the corresponding point determination is determined to examine the propriety of the method which determines the corresponding point by extracting the features.

The method for determining the corresponding point by extracting the features (based on the corner point or the invariant features) requires a relatively short matching time with the small number of the corresponding points and can attain the quite high accuracy of the corresponding point. However, since the corresponding point is extracted mostly in the corner point or the boundary line, color pair from the corresponding point cannot have various colors. Hence, when the propriety is examined and the method is unsuitable, other corresponding point determining method is applied.

More specifically, the step for determining the corresponding point determination suitability determines whether R, G, B color distribution value of the second matching point M or M2 exceeds or falls below 20% of R, G, B color distribution value of the entire image (S150). When the R, G, B color distribution value of the second matching point exceeds 20% of the R, G, B color distribution value of the entire image, the method for determining the corresponding point by extracting the features is appropriate and the second matching point is set to the corresponding point (S160).

By contrast, when the R, G, B color distribution value of the second matching point falls below 20% of the R, G, B color distribution value of the entire image, the method for determining the corresponding point by extracting the features is inappropriate and the method for determining the corresponding point using the dense stereo matching is selected.

The method for determining the corresponding point using the dense stereo matching finds the corresponding point by stereo-matching every pixel, re-derives the matching point using the dense stereo matching (S170), and determines the re-derived matching point as the corresponding point (S172).

While the dense stereo matching requires a longer matching time and exhibits lower reliability than the method for searching for the corresponding point by extracting the features, the color pair includes every color of the image. Herein, the matching method can be the same as or similar to that as aforementioned and shall be omitted.

As such, the present invention first adopts the method for searching for the corresponding point by extracting the features, and can search for the corresponding point using the dense stereo matching when the conditions are not satisfied (S160 and S170).

(2) Second Step (S200)

Figure 3:
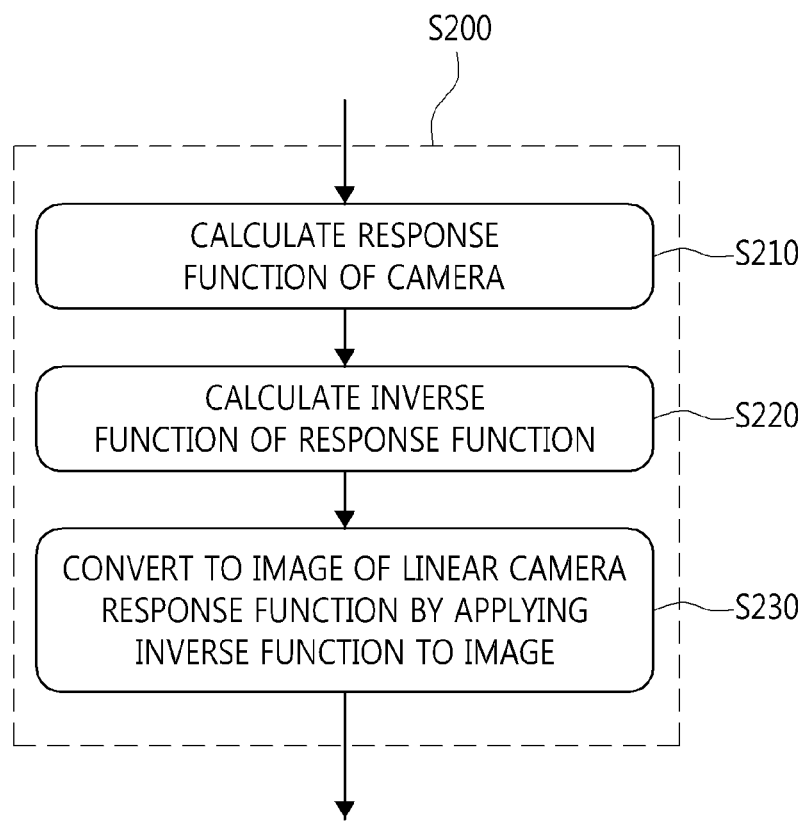
FIG. 3 is a detailed flowchart of a radiometric calibrating step of FIG. 1.
Figure 4:
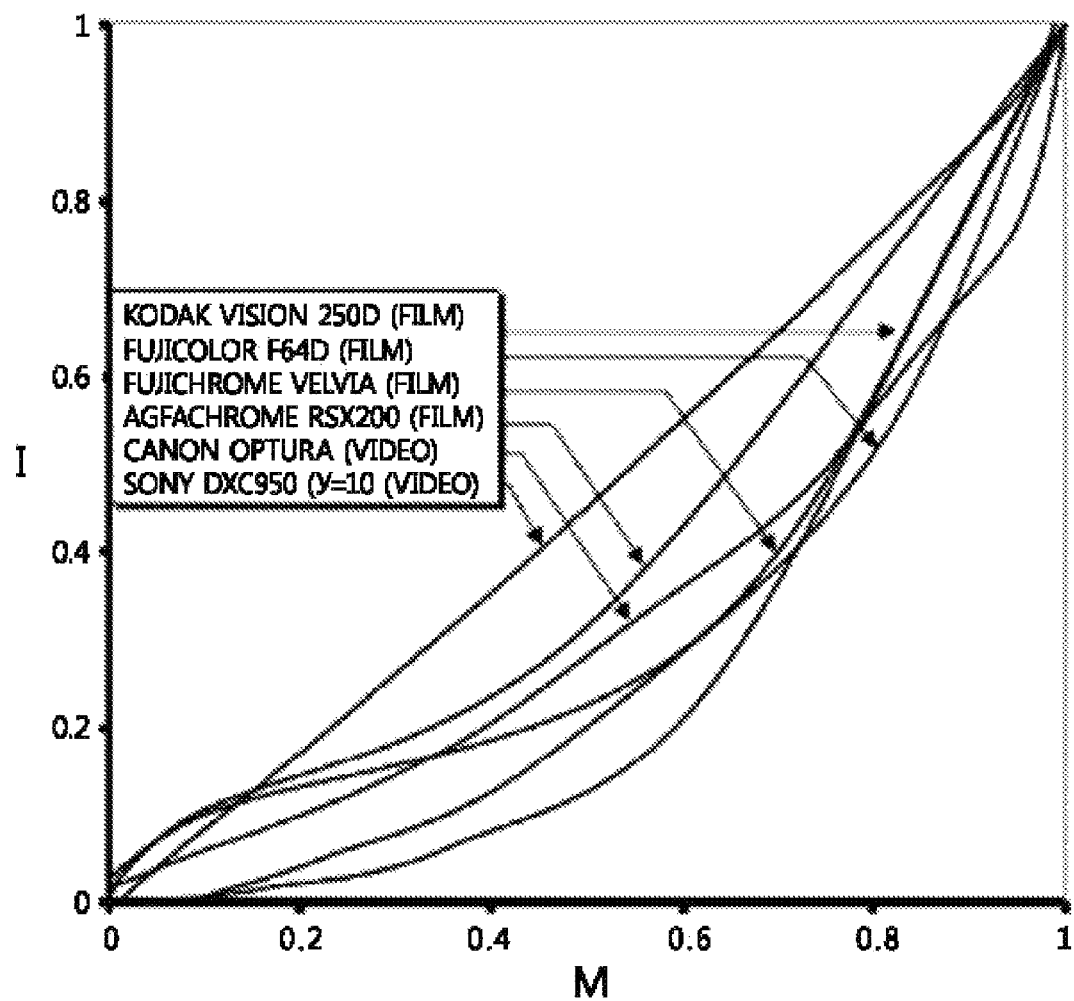
FIG. 4 is a graph of response functions of cameras.

FIG. 3 is a detailed flowchart of the radiometric calibrating step (S200) of FIG. 1, and FIG. 4 is a graph of response functions of cameras.

Referring to FIG. 3, the radiometric calibrating step (S200) includes calculating the response function of the camera (S210), calculating an inverse function of the response function (S220), and converting to an image having a linear camera response function by applying the calculated inverse function to the image (S230). The corresponding color for the calibration can be acquired in the corresponding point searching step (S100) as described earlier.

Herein, the radiometric calibration calibrates the camera response function to the linear function by calculating the camera response function of the image and applying its inverse function to the image.

The camera response function indicates the relation between measurement from the camera image and scene radiance.

In general, a digital camera converts the light amount coming through a lens to an electric signal using an image sensor such as CCD and CMOS and converts the electric signal to a digital signal. At this time, a camera used for surveillance or machine vision outputs the digital value linearly proportional to the light intensity and thus has the linear camera response function. Digital cameras used by most of users or broadcasting cameras do not have the linear camera response function according to the camera type or the surrounding environment. Thus, it is necessary to minimize the color difference according to the camera response function difference of the corresponding image.

In this regard, FIG. 4 shows various response functions of diverse film cameras or video cameras. In FIG. 4, the X axis corresponds to the measurement from the camera image, and the Y axis corresponds to the scene radiance.

The camera response function can be given by Equation 3.

$$M = g(I) \qquad \text{[Equation 3]}$$

g function denotes the camera response function, I denotes the scene radiance, and M denotes the scene (the camera image).

Thus, when the inverse function (the function f) of the camera response function g is applied to the scene M, the scene can be converted to an image indicating the scene radiance, which can be given by Equation 4.

$$I = f(M), \text{ where } \theta = g^{-1} \qquad \text{[Equation 4]}$$

As such, the present invention can convert the image of the nonlinear camera response function to the image of the linear camera response function (S200).

(3) Third Step (S300)

After the radiometric calibration (S200), the color difference between the corresponding images is reduced by calculating a color conversion matrix. The color conversion matrix can be calculated in various manners.

For example, the color conversion matrix can be calculated based on any one of Equation 5, Equation 6, and Equation 7.

$$\sum_{x=1}^{NS} \left( \overrightarrow{Ic_s} - \left( a_c \overrightarrow{Tc_s} + b_c \right) \right)^2, c \in R, G, B \qquad \text{[Equation 5]}$$

Equation 5 calculates the color conversion matrix according to a least square scheme. Herein, $Ic_s$ denotes the RGB color of the target image, $Tc_s$ denotes the RGB color of the input image to convert, and $a_c$ and $b_c$ denote coefficients for matching the two colors.

$$\sum_{s=1}^{NS} \left( \vec{I_s} - T_{RGB} \cdot \vec{T_s} \right)^2 \quad \text{[Equation 6]}$$

Equation 6 calculates 3×3 RGB color conversion matrix. Herein, $I_s$ denotes the R, G, B vector of the S-th corresponding point in the input image, $T_{RGB}$ denotes each element of the color conversion matrix, and $T_s$ denotes the R, G, B vector of the S-th corresponding point in the target image.

$$\sum_{k=1}^{D} (t_{rck} Ir_s^k + t_{gck} Ig_s^k + t_{bck} Ib_s^k) + t_{c0} \cong Tc_s \quad \text{[Equation 7]}$$

Equation 7 calculates the color conversion matrix including a nonlinear polynomial. Herein, D denotes the degree in the nonlinear conversion, $t_{rck}$, $t_{gck}$, and $t_{bck}$ denote coefficients corresponding to the respective colors of each degree, $t_{c0}$ denotes a coefficient in the degree 0, $Ir_s^k$, $Ig_s^k$ and $Ib_s^k$ denote the R, G, B value of each degree of the input image, and $Tc_s$ denotes one channel value (one of R, G, and B) of the target image. Equation 5, Equation 6, and Equation 7 are well known and thus shall not be further explained.

As such, the color of the corresponding image can be identical by calculating and applying the color conversion matrix to every pixel of the corresponding image (S300).

(4) Fourth Step (S400)

Figure 5:
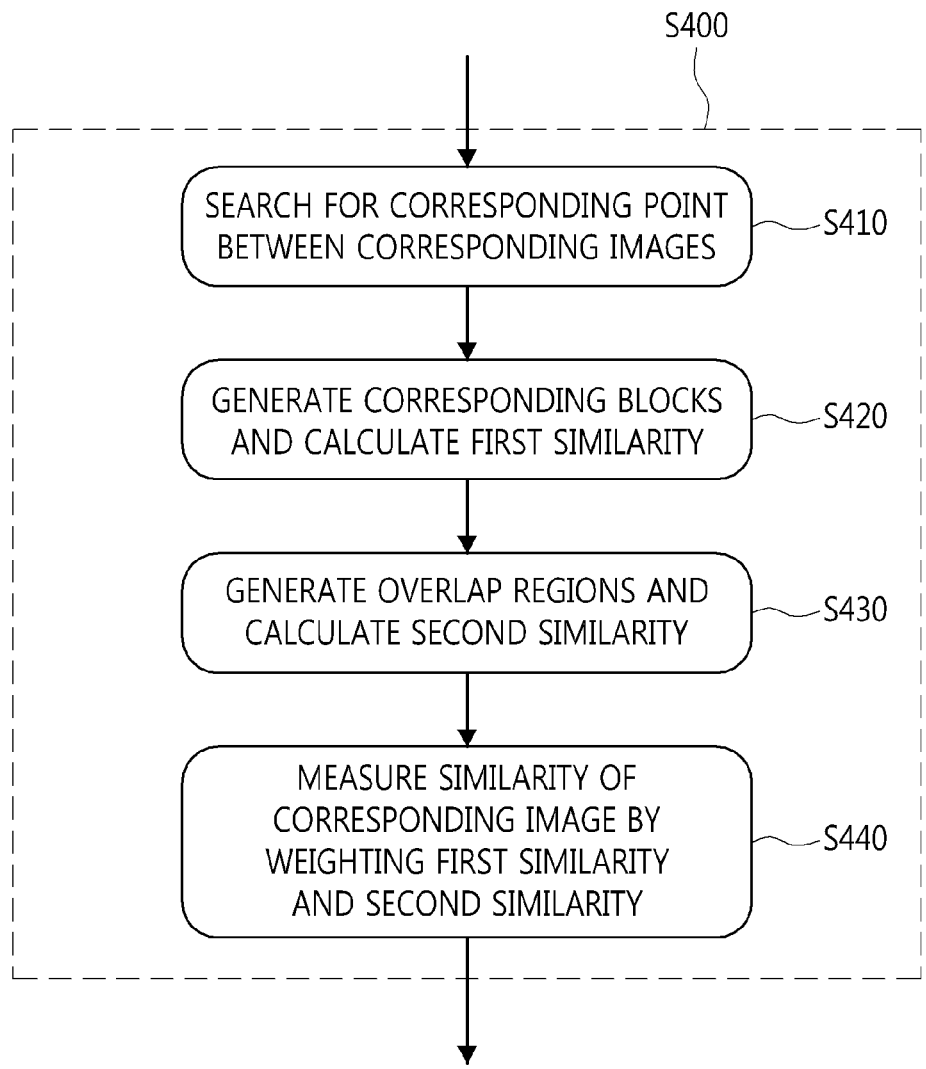
FIG. 5 is a detailed flowchart of a similarity measuring step of FIG. 1.

FIG. 5 is a detailed flowchart of the similarity measuring step (S400) of FIG. 1.

Referring to FIG. 5, the similarity measuring step (S400) includes a 2-1 step for searching for the corresponding point between the corresponding images (S410), a 2-2 step for calculating a first similarity by generating a plurality of corresponding blocks in the corresponding image and comparing the color distribution of the corresponding blocks (S420), a 2-3 step for calculating a second similarity by generating overlap regions in the whole corresponding image region and comparing the color distribution of the overlap regions (S430), and a 2-4 step for measuring the similarity of the corresponding image by applying a weight to the first similarity and the second similarity (S440). Hereafter, the steps are explained in detail.

4-1 Step (S410)

The 4-1 step for searching for the corresponding point between the corresponding images are the same as or similar to the first step (S100) of the corresponding image processing method as stated above, and thus shall be omitted here.

4-2 Step (S420)

Figure 6:
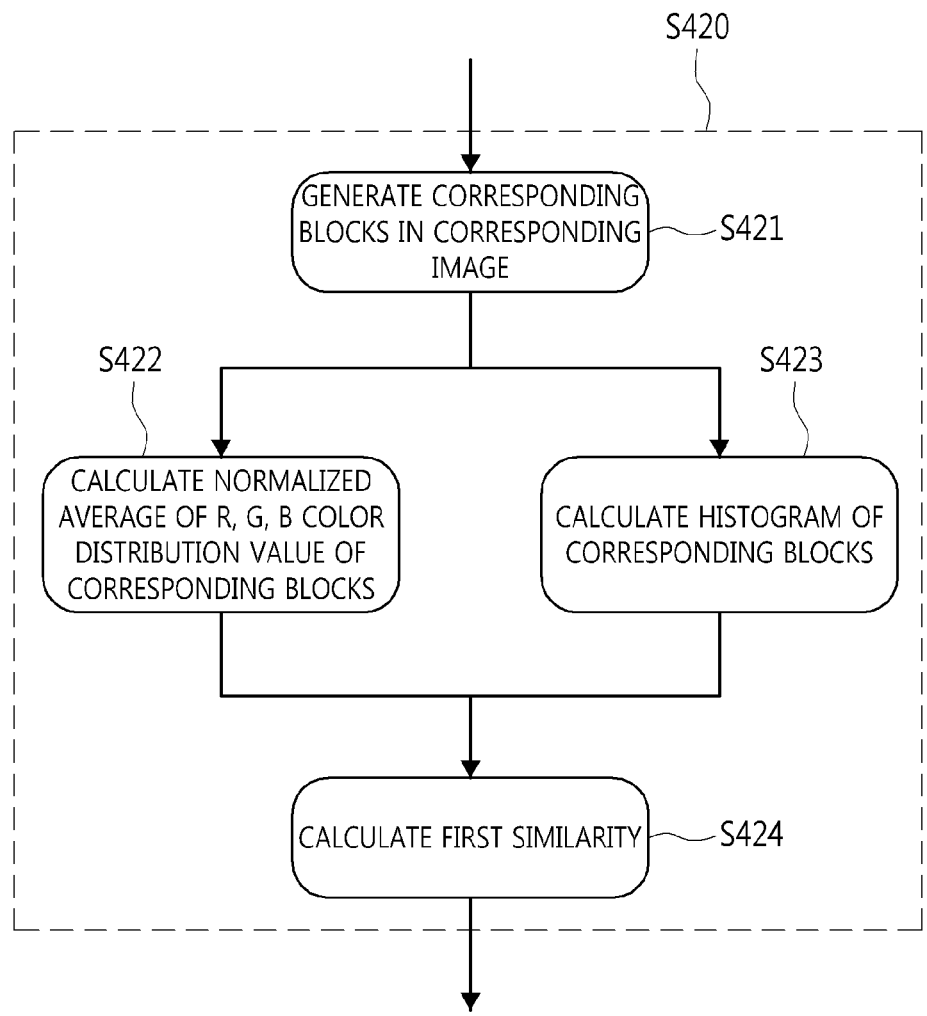
FIG. 6 is a detailed flowchart of a first similarity calculating step of FIG. 5.

FIG. 6 is a detailed flowchart of the first similarity calculating step of FIG. 5.

Referring to FIG. 6, to calculate the first similarity, the plurality of the corresponding blocks is generated in the corresponding image. Herein, the corresponding block indicates a square region including the corresponding points in the corresponding image (S421).

Next, a normalized average of the R, G, B color intensity value of the corresponding blocks is calculated and compared, which can be expressed as Equation 8.

$$S_\mu^c(i, j) = \sqrt{\sum_{k=1}^{N} \left( \frac{\mu_{ik}^c}{\sigma_{ik}^c} - \frac{\mu_{jk}^c}{\sigma_{jk}^c} \right)^2} \quad \text{[Equation 8]}$$

$\mu_{ik}^c$ and $\mu_{jk}^c$ denote the R, G, B color intensity average in the channel C of the k-th corresponding block of the image i and the image j, and $\sigma_{ik}^c$ and $\sigma_{jk}^c$ denote the standard deviation of the R, G, B color intensity value in the channel C of the k-th corresponding block of the image i and the image j. The channel C indicates one channel selected from R, G, and B.

Equation 8 which calculates the color similarity for the blocks, squares the difference of the normalized average obtained by dividing the average by the standard deviation, and then adds the squares of the corresponding blocks, and takes the square root (S422).

Next, a histogram of the corresponding blocks is calculated and compared. Herein, the histogram is a function representing a ratio of each density level of the image to the number of the pixels having the density level or the total number of the pixels. The histogram can be calculated and compared based on Equation 9.

$$d^c(H_i, H_j) = \sum_{l=1}^{B} |h_i^c(l) - h_j^c(l)| \quad \text{[Equation 9]}$$

$H_i$ and $H_j$ denote the histogram of the two corresponding regions, and B denotes the number of bins. $h_i^c(l)$ and $h_j^c(l)$ denote the histogram value corresponding to the channel C in the l-th bin of the image i and the image j. The channel C indicates one channel selected from R, G, and B.

Equation 9 calculates the similarity of the corresponding block by adding up absolute values of the histogram difference for each bin. Meanwhile, when the number of the corresponding blocks N is greater than 50 at minimum, the size of the bin can be set to 5.

To calculate and compare the histogram, some other methods than Equation 9 can be used. For example, a nonparametric comparison method such as $\chi^2$ (chi-square) distance or Kolmogorov-Smirnov distance, a comparison method using information theory such as Kullback-Liebler (KL) distance, and ground distance measurement such as Earth Movers Distance (EMD) can be used. Those methods are well known and their detailed descriptions shall be omitted (S423).

Next, the first similarity is calculated by weighting the normalized average difference and the histogram difference. The first similarity can be given by Equation 10.

$$S_{block}(i, j) = \sum_{c=r,g,b} S_\mu^c(i, j) + \alpha_1 \cdot \sum_{c=r,g,b} \sqrt{\sum_{k=1}^{N} [d_k^c(H_i, H_j)]^2} \quad \text{[Equation 10]}$$

$S_{block}(i,j)$ denotes the first similarity, $S_\mu^c(i,j)$ denotes the difference of the normalized average of the R, G, B color intensity value in the channel C of the corresponding block, and $d_k^c(H_i,H_j)$ denotes the histogram difference of the corresponding image of the channel C. The channel C indicates one channel selected from R, G, and B. $\alpha_1$ is the weight and varies according to the importance of the normalized average difference and the histogram difference. The default value of $\alpha_1$ can be set to 0.5 (S424).

4-3 Step (S430)

Figure 7:
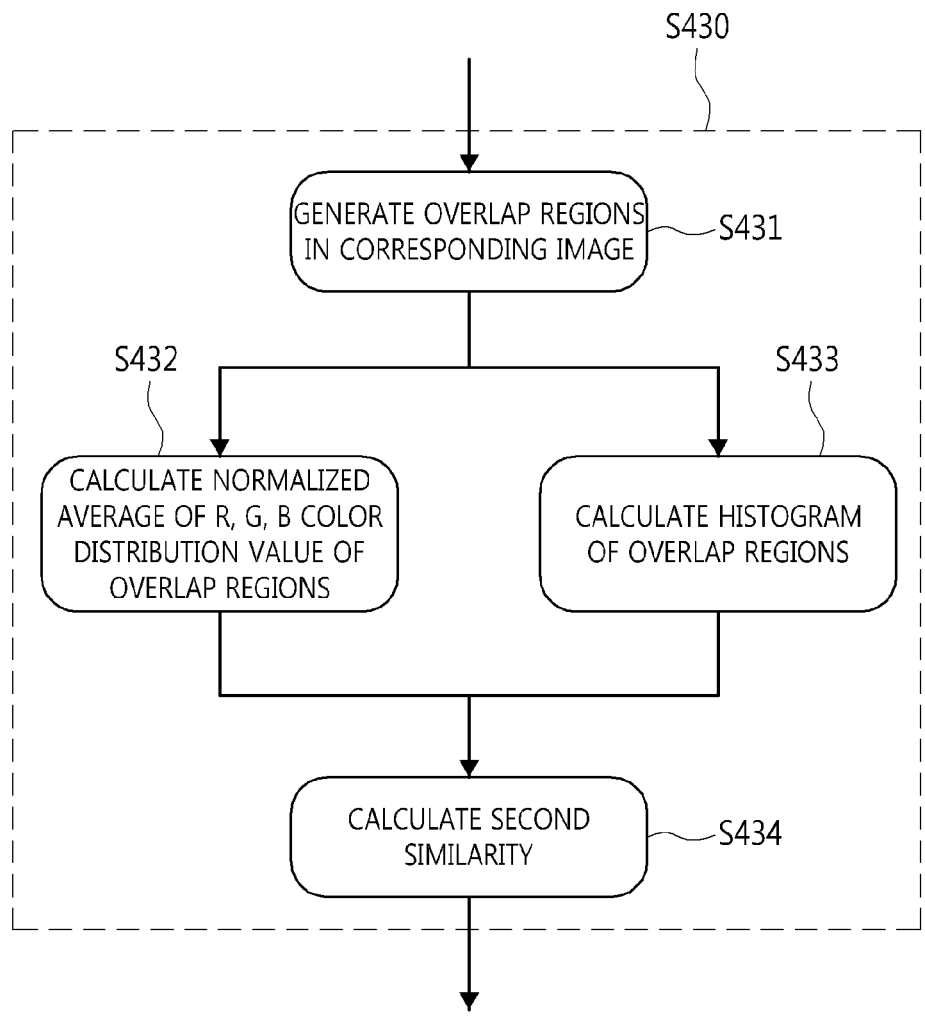
FIG. 7 is a detailed flowchart of a second similarity calculating step of FIG. 5.

FIG. 7 is a detailed flowchart of the second similarity calculating step (S430) of FIG. 5.

Referring to FIG. 7, to calculate the second similarity, the overlap regions where the images are overlapped in the whole region of the corresponding image are generated. Herein, for example, provided that the corresponding image includes a first image and a second image, the region superimposing the first image on the second image and the region superimposing the second image on the first image are the overlap regions.

Since merely the color comparison of the corresponding block may not cover various color distributions in the image, the color is compared in the whole region of the corresponding image. Yet, since the overlap part between the corresponding images can be part of the image, the same result can be attained more simply by generating the overlap regions and measuring the similarity only in the overlap regions.

To generate the overlap region, for example, when every point of the image i is moved into the image j using the homography, the points in the image j can be the overlap regions. Conversely, when every point of the image j is moved into the image i, the points in the image i can be the overlap regions (S431).

Next, the normalized average of the R, G, B color distribution value of the overlap regions is calculated and compared, and the histogram of the overlap regions is calculated and compared. These steps are the same as or similar to the 4-2 step (S420) and shall be omitted here (S432 and S433).

Next, the second similarity is calculated by weighting the normalized average difference and the histogram difference of the overlap regions. The second similarity can be given by Equation 11.

$$S_{image}(i,j) = \sum_{c=R,G,B} \left| \frac{\mu_i^c}{\sigma_i^c} - \frac{\mu_j^c}{\sigma_j^c} \right| + \alpha_2 \cdot \sum_{c=R,G,B} d^c(H_i, H_j) \quad \text{[Equation 11]}$$

$S_{image}(i,j)$ denotes the second similarity, $\mu_i^c$ and $\mu_j^c$ denote the average of the R, G, B color intensity value in the channel C in the image i or j, and $\rho_i^c$ and $\sigma_j^c$ denote the standard deviation of the R, G, B color intensity value in the channel C in the image i or j. $d^c(H_i, H_j)$ denotes the histogram difference of the corresponding image in the channel C (the channel C indicates one of the R, G, B channels), and $\alpha_2$ is a weight. $\alpha_2$ can be differently set according to the importance of the normalized average difference and the histogram difference, and its default value can be set to 0.5 (S434).

4-4 Step (S440)

Next, the similarity of the corresponding image is measured by weighting the first similarity and the second similarity calculated in the 4-2 step (S420) and the 4-3 step (S430).

That is, the similarity of the corresponding image is the sum of the first similarity measured based on the corresponding block and the second similarity measured based on the overlap region, and is given by Equation 12.

$$S_{total}(i,j) = S_{block}(i,j) + \beta \cdot S_{image}(i,j) \quad \text{[Equation 12]}$$

$S_{block}(i,j)$ corresponds to the first similarity, $S_{image}(i,j)$ denotes the second similarity, and $\beta$ corresponds to a weight. The weight $\beta$ can be defined by Equation 13.

$$\beta = 0.1 + 0.4 \times \left( 1 - \frac{\bigcup_{k=1}^{N} \text{Region}_i(k)}{\text{Overlap Region}_i} \right) + 0.4 \times \left( 1 - \frac{\bigcup_{k=1}^{N} \text{Region}_j(k)}{\text{Overlap Region}_j} \right) \quad \text{[Equation 13]}$$

OverlapRegion$_i$ denotes the overlap region in the image i and OverlapRegion$_j$ denotes the overlap region in the image j. Region$_i$(k) denotes the k-th block region in the image i and Region$_j$(k) denotes the k-th block region in the image j. That is, the weight $\beta$ is determined by the ratio of the union region of each block region to the whole overlap region in the images i and j. Parameters 0.1 and 0.4 can be altered according to the image condition and the environment condition (S440).

The corresponding image processing method according to the exemplary embodiments of the present invention can be embodied as computer-readable codes on a computer-readable recording medium. The computer-readable recording medium can include any recording device which can store data readable by a computer system. For example, the computer-readable recording medium includes a Read-Only Memory (ROM), a Random-Access Memory (RAM), CD-ROMs, magnetic tapes, floppy disks, and optical data storage devices, and can also be realized through carrier waves. The computer-readable recording medium can be distributed over network-coupled computer systems so that the computer-readable codes can be stored and executed in a distributed manner. Functional programs, codes, and code segment to accomplish the corresponding image processing method can be easily construed by programmers in the art the present invention pertains to.

As set forth above, by searching for the corresponding point of the corresponding image by detecting and matching the features, the correspondence accuracy can be enhanced more than the conventional geometric registration. By generating the corresponding blocks and the overlap regions in the corresponding image, calculating the similarity in each case, and applying the weight, the similarity reliability of the corresponding image can be improved. The automatic corresponding point matching is feasible without using the Macbeth color chart, and the color can be compensated even under various conditions such as automatic change of the camera parameter, lighting change, or weather change. In addition, since the radiometric calibration gives the linear function to the camera response function of the corresponding image, error from the nonlinear camera response function can be eliminated. Further, the color conversion matrix can be calculated using not only the 3×3 RGB color conversion matrix but also the least square or the nonlinear polynomial.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:
1. A corresponding image processing method comprising:
   a first step for searching for a corresponding point between a target image and a corresponding image;
   a second step for performing radiometric calibration such that a camera response function of the corresponding image has a linear function;

a third step for compensating for a color of the corresponding image by calculating a color conversion matrix; and
a fourth step for measuring similarity between the target image and the corresponding image,
wherein the first step comprises:
detecting features using a feature detecting method based on a corner point;
deriving first matching points N by matching the features;
deriving second matching points M by removing outlier in the first matching points N; and
determining suitability of the feature detection, and
wherein the determining the suitability of the feature detection comprises:
when a number of the second matching points M is divided by a number of the first matching points N and a quotient falls below 0.7, re-detecting the features using a feature detecting method based on invariant features; and
matching the features and re-deriving second matching points M2 by removing outlier.

2. The corresponding image processing method of claim 1, wherein the first step further comprises:
determining corresponding point determination suitability, and
the determining of the corresponding point determination suitability determines whether R, G, B color distribution value of the second matching points M or the second matching points M2 exceeds or falls below 20% of R, G, B color distribution value of the entire image.

3. The corresponding image processing method of claim 2, wherein the first step further comprises:
when the R, G, B color distribution value of the second matching points M or the second matching points M2 exceeds 20% of the R, G, B color distribution value of the entire image, determining the second matching point M or M2 as a corresponding point;
when the R, G, B color distribution value of the second matching point M or M2 falls below 20% of the R, G, B color distribution value of the entire image, re-deriving a matching point using dense stereo matching; and
determining the re-derived matching point as the corresponding point.

4. The corresponding image processing method of claim 1, wherein the second step comprises:
calculating the response function of a camera;
calculating an inverse function of the response function; and
converting an image to an image having a linear camera response function by applying the calculated inverse function to the image.

5. The corresponding image processing method of claim 1, wherein the third step is any one of a method for calculating the color conversion matrix based on least square based on Equation 1, a method for calculating a 3×3 RGB color conversion matrix based on Equation 2, and a method for calculating a color conversion matrix comprising a nonlinear polynomial based on Equation 3:

$$\sum_{s=1}^{NS} \left( \vec{Ic_s} - (a_c \vec{Tc_s} + b_c) \right)^2, c \in R, G, B \quad (1)$$

where $Ic_s$ denotes an RGB color of a target image, $Tc_s$ denotes an RGB color of an input image to convert, and $a_c$ and $b_c$ denote coefficients for matching the two colors, $$\sum_{s=1}^{NS} \left( \vec{I_s} - T_{RGB} \cdot \vec{T_s} \right)^2 \quad (2)$$

where $I_s$ denotes R, G, B vector of an S-th corresponding point in the input image, $T_{RGB}$ denotes each element of the color conversion matrix, and $T_s$ denotes the R, G, B vector of the S-th corresponding point in the target image, and $$\sum_{k=1}^{D} (t_{rck} Ir_s^k + t_{gck} Ig_s^k + t_{bck} Ib_s^k) + t_{c0} \cong Tc_s \quad (3)$$

where D denotes a degree in nonlinear conversion, $t_{rck}$, $t_{gck}$, and $t_{bck}$ denote coefficients corresponding to the respective colors of each degree, $t_{c0}$ denotes a coefficient in the degree 0, $Ir_s^k$, $Ig_s^k$, and $Ib_s^k$ denote R, G, B values of each degree of the input image, and $Tc_s$ denotes one channel value (one of R, G, and B) of the target image.

6. The corresponding image processing method of claim 1, wherein the fourth step comprises:
a 4-1 step for searching for a plurality of corresponding points between corresponding images;
a 4-2 step for calculating a first similarity indicating similarity level of the corresponding blocks by generating a plurality of corresponding blocks comprising the corresponding points in the corresponding image and comparing color distribution of the corresponding blocks;
a 4-3 step for calculating a second similarity indicating similarity level of the overlapping regions by generating overlap regions where images are overlapped in a whole region of the corresponding image and comparing color distribution of the overlap regions; and
a 4-4 step for measuring similarity of the corresponding image by applying a weight to the first similarity and the second similarity.

7. The corresponding image processing method of claim 6, wherein the 4-2 step comprises:
generating the plurality of the corresponding blocks comprising the corresponding points in the corresponding image;
calculating and comparing a normalized average of R, G, B color intensity value of the corresponding blocks;
calculating and comparing a histogram of the corresponding blocks; and calculating the first similarity by applying a weight to the normalized average difference and the histogram difference.

8. The corresponding image processing method of claim 7, wherein the calculating of the first similarity is based on Equation 4:

$$S_{block}(i,j) = \sum_{c=r,g,b} S_\mu^c(i,j) + \alpha_1 \cdot \sum_{c=r,g,b} \sqrt{\sum_{k=1}^{N} [d_k^c(H_i, H_j)]^2} \quad (4)$$

where $S_{block}(i,j)$ denotes the first similarity, $S_\mu^c(i,j)$ denotes the difference of the normalized average of the R, G, B color intensity value in a channel C of the corresponding block, $d_k^c(H_i,H_j)$ denotes the histogram difference of the corresponding image of the channel C, the channel C indicates one channel selected from R, G, and B, and $\alpha_1$ is the weight.

9. The corresponding image processing method of claim 6, wherein the 4-3 step comprises:
generating the overlap regions where the images are overlapped in the whole region of the corresponding image;
calculating and comparing the normalized average of the R, G, B color intensity value of the overlapping regions;
calculating and comparing the histogram of the overlap regions; and
calculating the second similarity by applying a weight to the normalized average difference and the histogram difference.

10. The corresponding image processing method of claim 9, wherein the calculating of the second similarity is based on Equation 5:

$$S_{image}(i, j) = \sum_{c=R,G,B} \left| \frac{\mu_i^c}{\sigma_i^c} - \frac{\mu_j^c}{\sigma_j^c} \right| + \alpha_2 \cdot \sum_{c=R,G,B} d^c(H_i, H_j) \quad (5)$$

where $S_{image}(i,j)$ denotes the second similarity, $\mu_i^c$ and $\mu_j^c$ denote the average of the R, G, B color intensity value in the channel C in an image i or j, $\sigma_i^c$ of and $\sigma_j^c$ denote a standard deviation of the R, G, B color intensity value in the channel C in the image i or j, $d^c(H_i,H_j)$ denotes the histogram difference of the corresponding image in the channel C, the channel C indicates one selected from R, G, and B, and $\alpha_2$ is the weight.

11. The corresponding image processing method of claim 6, wherein the 4-4 step is based on Equation 6 and Equation 7:

$$S_{total}(i,j) = S_{block}(i,j) + \beta \cdot S_{image}(i,j) \quad (6)$$

where $S_{block}(i,j)$ denotes the first similarity, $S_{image}(i,j)$ denotes the second similarity, and $\beta$ denotes the weight, and $$\beta = 0.1 + 0.4 \times \left(1 - \frac{\bigcup_{k=1}^{N} Region_i(k)}{Overlap\ Region_i}\right) + 0.4 \times \left(1 - \frac{\bigcup_{k=1}^{N} Region_j(k)}{Overlap\ Region_j}\right) \quad (7)$$

where Overlap Region$_i$ denotes the overlap region in the image i, Overlap Region$_j$ denotes the overlap region in the image j, Region$_i$(k) denotes a k-th block region in the image i, and Region$_j$(k) denotes a k-th block region in the image j.

12. A non-transitory computer-readable recording medium containing a program for executing the method of claim 1 in a computer.

* * * * *